United States Patent

[11] 3,574,292

| [72] | Inventor | Gene A. Butts |
| | | Escondido, Calif. |
| [21] | Appl. No. | 851,990 |
| [22] | Filed | Aug. 21, 1969 |
| [45] | Patented | Apr. 13, 1971 |
| [73] | Assignee | Do All Company |
| | | Des Plaines, Ill. |

[54] INTERFEROMETER MOTION AND VELOCITY CONTROLLER
5 Claims, 4 Drawing Figs.

[52] U.S. Cl. ................................................. 91/37,
356/106
[51] Int. Cl. ............................................. F15b 21/02
[50] Field of Search ........................................... 91/37;
356/106

[56] References Cited
UNITED STATES PATENTS

| 2,604,004 | 7/1952 | Root | 356/106 |
| 2,794,424 | 6/1957 | May | 91/37 |
| 3,086,151 | 4/1963 | Herzl | 91/37 |
| 3,127,465 | 3/1964 | Stephens | 356/106 |
| 3,377,111 | 4/1968 | Brault | 356/106 |
| 3,488,123 | 1/1970 | Nichols | 356/106 |

OTHER REFERENCES

" Length Measuring Laser Interferometer" Cory et al. — Oct. 2, 1964 Union Carbide Corp.

*Primary Examiner*—Martin P. Schwadron
*Assistant Examiner*—C. F. Schimikowski
*Attorney*—Ira Milton Jones

ABSTRACT: An interferometer measuring system which constitutes means of measuring the magnitude and velocity of relative motion between two parts along a defined path, coacts with numerical command reference data to effect and control relative motion between the parts produced by drive means which may be incapable of dimensional or velocity predictability.

PATENTED APR 13 1971

Inventor
Gene A. Butts

By Indzitto Jones
Attorney

INTERFEROMETER MOTION AND VELOCITY CONTROLLER

This invention relates to motion and positioning control systems and has as its purpose and object to provide a new and improved method and apparatus for utilizing numerical data to control the motion, positioning and speed of a movable part, as for instance a table or carriage of a machine tool.

In prior numerical control systems, as exemplified by the Parsons et al. U.S. Pat. No. 2,820,187, and the Forrester et al. U.S. Pat. No. 3,069,608, the motion to be controlled was generally produced by a lead screw driven by a stepping motor or an equivalent thereof. Each increment of rotation imparted to the screw thus was intended to produce a finite increment of linear motion so that a count of the motor pulses would be a measure of the magnitude of the motion produced.

Since the torque capacity of a stepping motor is very low, it was necessary to use a recirculating ball-type nut with the lead screw in order to reduce friction as much as possible. This requirement limited the fineness of the lead screw pitch which, coupled with the practical limitation upon the number of steps or pulses per revolution that can be obtained with a stepping motor, restricted the resolution of the motion being controlled to relatively coarse increments. It also unduly restricted the velocity of the motion, which in the case of a machine tool is reflected in an objectionably slow traverse rate.

Compromise in the design of numerically controlled machine tools was thus inevitable. Any attempt to gain improved resolution of table motion adversely affected the traverse rate, and an increase in traverse rate could only be obtained at the expense of table motion resolution. To illustrate—with a stepping motor producing the customary 200 steps per revolution and operating at 1,000 steps per second—which is about the maximum that could be employed with prior control systems because of the manner in which the pulses were counted—and driving a five pitch screw (the finest useable with a recirculating ball nut without incurring prohibitive costs) each step or pulse of the motor produced a linear motion of 0.001 inch; and the maximum traverse achieved was on the order of 60 inches per minute. The seriousness of these limitations is obvious.

Slow traverse and coarse increment resolution, however, were not the only objections to prior automatic motion and rate controlling systems. Positioning the movable part, as called for by the programming medium—punched tape, cards, magnetic tape or the like—was accomplished by translating the coded information on the programming medium into a succession of energy pulses by which the stepping motor was driven through the number of steps needed to bring the moved part to the desired location.

Obviously, the accuracy of the resultant positioning depended not only upon delivering the required number of energy pulses to the motor and the ability of the motor to translate each pulse into the intended increment of linear motion, but also upon the degree of precision built into the lead screw. This meant that the lead screw had to be machined with the utmost linear precision and that the drive system had to be free of backlash. Needless to say, the cost of achieving such precision is a serious factor.

But even with a lead screw ground with the utmost precision and a minimum of backlash in the drive system, there was no assurance that the count of the steps of motor operation or increments of rotation of the lead screw was a reliable measure of the magnitude of the linear motion imparted to the table or other part being moved in response to the command data fed to the system. There was always the possibility of missed counts, especially at maximum traverse when the frequency of the counts would be 1,000 per second or more. In addition, drifting errors in the lead screw would introduce unpredictable consequences in the absence of costly corrective gadgetry.

Hence, despite the costly precision built into the lead screw and its ball recirculating nut, there was no assurance that even a correct count of the motor pulses would be an accurate measure of table motion. For this reason, prior motion producing and controlling technique was not adapted to the use of the open loop control principle in which there is only one measuring system and no means for comparing the output with the input. The inherent error potential in the one measuring system made it necessary to provide a secondary measuring system or, in other words, to use the closed loop principle wherein the result of the output is measured and fed back for comparison with the input. Error in position revealed by the secondary measuring system was sometimes used to shut down the entire system; more often it was employed as a feedback by which the drive motor was instructed to produce corrective motion. This duplication of measuring systems, needless to say, made prior control systems very expensive and complicated.

The discovery that an interferometer can be used to sense the position of the moved part made it possible to utilize the "open loop" principle in which the position-sensing instrumentality itself constitutes the primary element of the controller, and hence obviates the need for costly precision machining of lead screws and precision drive transmissions.

More specifically, therefore, in this invention the position-sensing device, which is a laser energized interferometer, itself controls the motion and positioning of the part to be moved, so that the drive means—which includes a prime mover by which motion is imparted to the part—requires no dimensional predictability and is preferably infinitely variable. Hence, the drive means may be an inexpensive lead screw driven by a hydraulic motor, or it may be a hydraulic cylinder. But, whatever it is, it simply produces continuous and not incremental motion until the sensing device is satisfied.

Unprecedented accuracy in controlling the positioning of a movable part is accomplished in this invention by the use of a laser interferometer as the position-sensing and drive control instrumentality. The measurement resolution attainable therewith is measured in millionths of an inch, rather than thousandths of an inch. In fact, the measurement resolution ability of the control—because of this use of the interferometer—is so great in comparison to the resolution capacity of the servomechanism by which the output of the control is translated into motion of the part to be moved, that with presently available servomechanisms the full capacity of the control cannot be used.

In the light of the foregoing, it will be seen that the invention has as its purpose a new and improved method of controlling relative motion between two parts along a defined path, one of which may be the table or carriage of a machine tool and the other the structure on which it slides, and—very broadly—in the combination of instrumentalities by which the method is performed.

With these observations and objects in mind, the manner in which the invention achieves its purpose will be appreciated from the following description and the accompanying drawings. This disclosure is intended merely to exemplify the invention. The invention is not limited to the particular structure or method disclosed, and changes can be made therein which lie within the scope of the appended claims without departing from the invention.

The drawings illustrate one complete example of the physical embodiment of the invention, constructed according to the best mode so far devised for the practical application of the principles thereof, and in which:

FIG. 1 is a perspective view of a machine tool illustrative of one area of utility of the control of this invention;

FIG. 2 diagrammatically illustrates the laser interferometer and the reflecting unit which coacts therewith to sense motion of the part being moved, in this case the table of the machine shown in FIG. 1;

Figure 1:
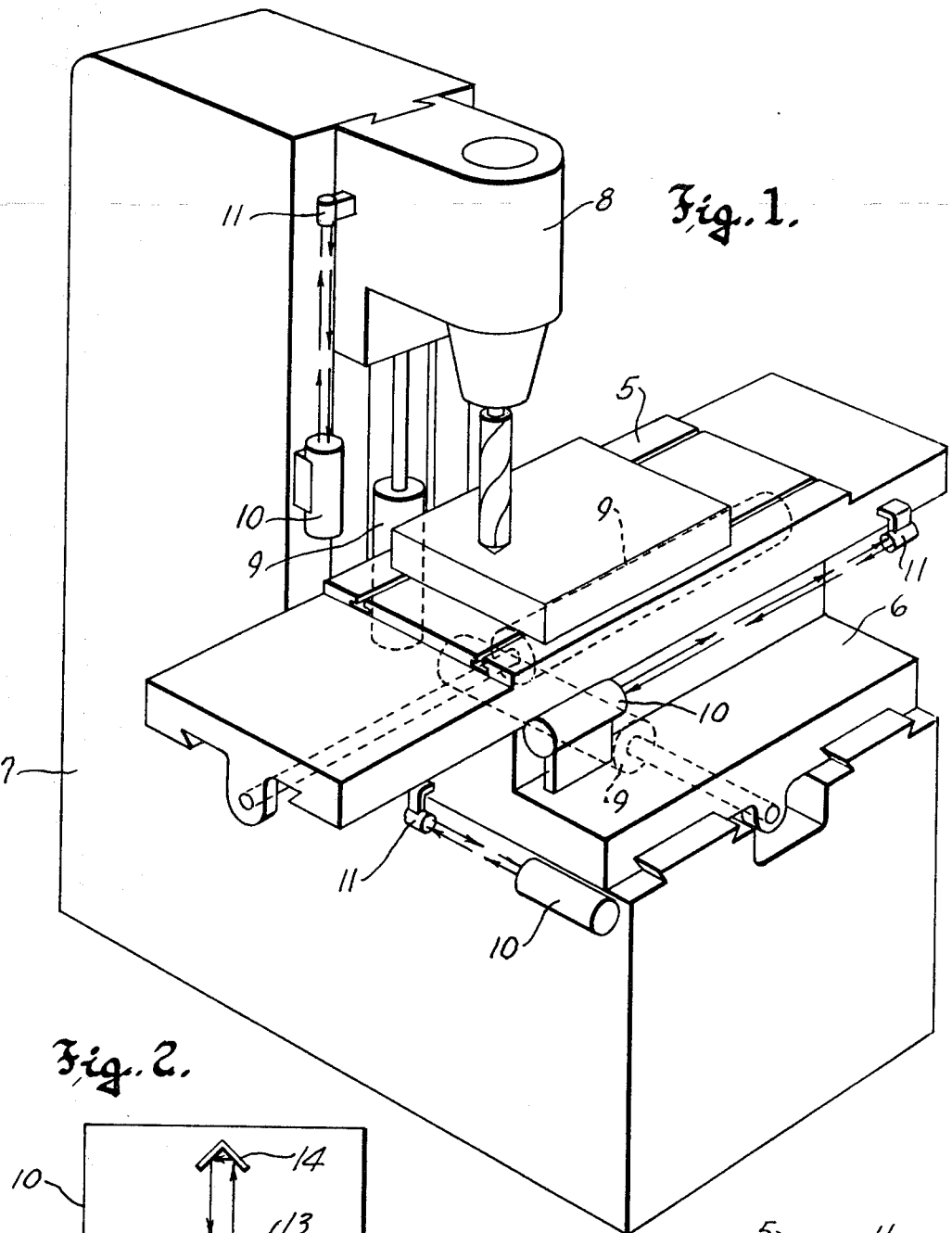

Referring to the drawings, the machine illustrated in FIG. 1 is a vertical spindle machining center, capable of drilling, reaming, boring, tapping and milling. Hence it is a three-axis machine having a work supporting table 5 riding in horizontal ways on a carriage 6 that in turn rides in horizontal ways on the main frame 7, and a tool carrying head 8 mounted in vertical ways on the column of the machine frame. The table motion is along the X-axis, the carriage moves on the Y-axis and the vertical motion of the head is along the Z-axis.

Separate drives are provided for the table, the carriage and the tool carrying head. In each case, the drive comprises a hydraulic cylinder 9, the piston of which is suitably connected with the part to be moved while the cylinder is fixed with respect to the machine part on which the movable part rides. Thus, in the case of the table 5, the cylinder is fixed to the carriage 6 and the piston is connected with the table; for the carriage 6, the cylinder is fixed to the main frame; and for the tool carrying head 8 the cylinder is also fixed with respect to the main frame.

It is significant to observe that, in each case, the drive is incapable of dimensional predictability. In other words, as distinguished from a precision-machined lead screw driven by a stepping motor wherein every pulse of the motor results (at least ostensibly) in identically the same increment of relative motion between the two parts, the drives employed in this invention do not effect motion in uniform increments, or at least do not have to do so.

Figure 2:
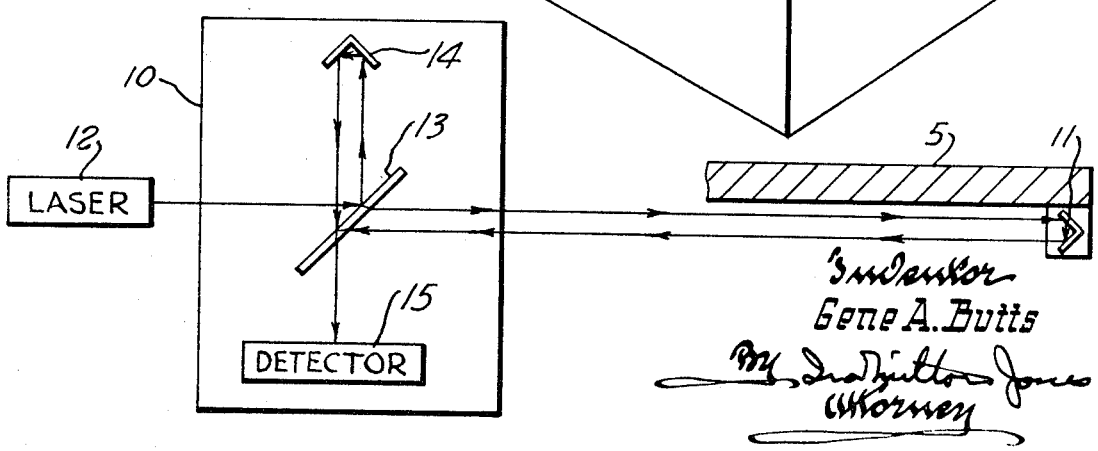

The heart of this invention resides in the use of an interferometer 10, diagrammatically illustrated in FIG. 2, for each of the axes of motion involved in the machine to which the invention is applied. Each interferometer coacts with a reflecting mirror 11 which is preferably a trihedral prism, to measure motion along its respective axis. Thus, for the X-axis, the interferometer is fixedly mounted with respect to or on the carriage 6, while its coacting reflecting mirror is mounted on the table 5. For the Y-axis, the interferometer is on the frame of the machine and its coacting reflecting mirror is mounted on the carriage 6; and for the Z-axis, the interferometer is on the upright column of the machine frame, while its coacting reflecting prism (trihedral) is on the head 8. In each case, the specific locations of the interferometer and the trihedral reflector, of course, depend upon the structural design of the machine, but in any event they should be protected and so located that nothing will fall or move across the light beams connecting them.

Although interferometers are well known and probably need no description, for the convenience of those who may wish to review their understanding of this instrument, reference may be had to FIG. 2. As there diagrammatically illustrated, a beam of monochromatic light of fixed frequency and wavelength, which in this case comes from a laser 12, impinges upon a beam splitter 13. The beam splitter is a halfway mirror set at an angle of 45° to the light beam from the laser. Part of the light from this beam is reflected by the beam splitter to impinge upon and be reflected back by a mirror 14 which is preferably a trihedral prism and is fixed with respect to the beam splitter. This reflected beam is the reference beam of the interferometer.

The other part of the light beam that comes from the laser passes through the beam splitter and impinges upon and is reflected back by the trihedral prism 11 to form the measuring beam of the interferometer.

The returning beams recombine at the reflecting surface of the beam splitter where they interfere either destructively or constructively, depending upon the instantaneous phase relationship between the beams. This phase relationship continually oscillates between full in-phase and full out-of-phase as the length of the measuring beam increases or decreases. For example, if the measuring beam bouncing off the trihedral 11 is a quarter of a wavelength longer than that of the reference beam which comes from the trihedral 14, the two light beams are fully out of phase and hence cancel one another. At this instant, the photosensitive detector 15, which views the light pattern on the reflecting surface of the beam splitter, sees no light. On the other hand, if the two beams are in phase, the detector sees a bright spot.

Movement of the trihedral 11 towards or from the beam splitter along the axis of the measuring beam will thus result in a sinusoidal interference pattern with alternating dark and bright lines or fringes. Counting these fringes with a bidirectional counter and multiplying the count by an appropriate factor gives the distance the table or other movable part to which the reflecting trihedral 11 is attached, moves in inches or centimeters with respect to a datum point.

If the interference pattern is projected onto a screen, the fringes will move across it either to the left or the right, depending upon the direction of motion of the trihedral 11. Hence, the direction in which the fringes move affords an indication of the direction the table or other moved part is travelling. Observation of the interference fringes by a photosensor and coupling the output thereof to an electronic counter, thus provides a most accurate measurement of the distance the movable part moves.

In addition, by comparing the rate of the fringe counts with an accurate time base, the velocity of the moving part can be ascertained.

Figure 3:
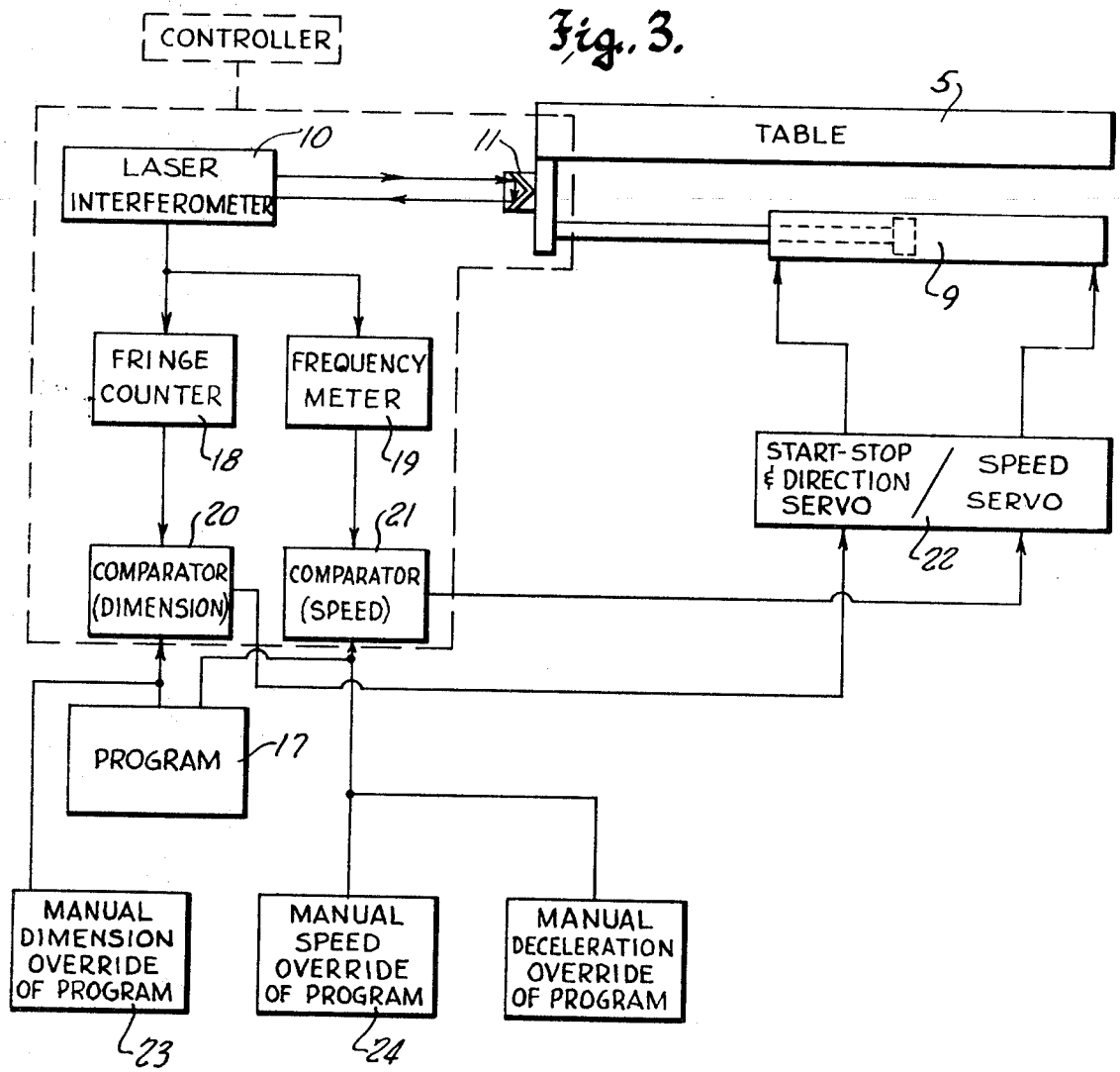
FIG. 3 is a block diagram of the complete control system.

The manner in which the laser interferometer is used to control the motion or travel of the table 5, the carriage 6 and the tool carrying head 8—and, for that matter, relative linear motion between any two parts—is diagrammatically depicted by the block diagram, FIG. 3.

In this diagram, the elements or instrumentalities within the dotted line labeled "Controller" constitute the means by which the commands that come from the program (block 17) are implemented to effect the desired motion of the member being moved, i.e., the table. From the interferometer 10 (represented by the block labeled "Laser/Interferometer")—specifically from its fringe detector—comes a signal which is a function of the distance the table moves and also the velocity of its motion. This signal is fed to an electronic fringe counter (block 18) and to frequency meter (block 19). These instrumentalities convert the interferometer output into numerical data in the form of an electric current or signal which identifies the magnitude and velocity of any motion of the table.

Because of the rapidity with which electronic fringe counters and frequency meters function, every movement of the table as sensed by the interferometer, no matter how slight or how fast, is evidenced by the numerical data which constitutes the outputs of the fringe counter and the frequency meter. These output signals are fed into digital comparators (blocks 20 and 21) where they are compared with numerical reference command data coming from the program (block 17). The program may be of any suitable form, as for instance a tape reader or decoder.

The comparator, functioning in a known manner, converts any imbalance between the reference command data and the data coming from the fringe counter and the frequency meter, to provide two electronic control signals, one of which is a dimension signal and the other a speed signal. These control signals are respectively fed to a "Start, Stop and Direction" servo and to a "Speed" servo (block 22) which in turn govern the operation of the prime-mover hydraulic cylinder 9.

Obviously, the command signals coming from the program 17 can command the controller to automatically effect motion of the table of any magnitude and at any speed within the capability of the drive mechanism but in addition, the program can be manually overridden to command the controller to effect any desired adjustment of the table. For this purpose, manual dimension and manual speed override means (blocks 23 and 24) are provided.

Also, to avoid hunting as the table approaches as its desired position, the program initiates the introduction into the comparator of final deceleration instructions. These automatic deceleration commands fed into the comparator by the program and keep the rate of travel within the response time of the "Start, Stop and Direction" servo.

Since the specific circuitry involved in the digital comparator, the electronic fringe counter, the frequency meter, the program and the connections therebetween form no part of the invention, and can be of any suitable design, these details have not been disclosed. By the same token, the servo can take any suitable form, and where the prime movers are hydraulic cylinders, these servos can be combination volume and direction control valves, of which there are many available.

It should also be understood that where the term "interferometer" is employed herein, it means the beam splitter and the trihedrals which provide the reference leg and the measuring leg, and while every interferometer must be energized by a beam of monochromatic light, the laser used to produce the beam, strictly speaking, is not part of the interferometer.

Obviously, other sources of monochromatic light other than lasers could be used and would fall within the scope of the invention.

Figure 4:
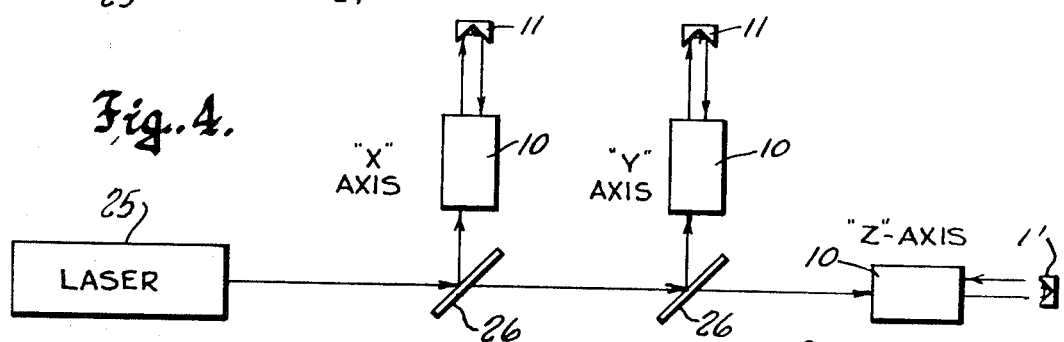
FIG. 4 illustrates the concept of using a single laser to energize more than one interferometer.

In the illustrative depiction in FIG. 1 of the adaption of this invention to a three-axis machine tool, each interferometer has its own laser, but as shown in FIG. 4, a single laser 25, through appropriate use of beam splitters 26, can energize all three of the interferometers.

OPERATION

Assume that by manual command the table has been brought to a predetermined datum or start position. This done, the counter is cleared so that its readout is zero. The automatic command system is now activated, turned on, and immediately the preprogrammed input data takes over.

Assume also that, from the "start" position to which the table was brought under manual command, the table must move 3.7900 inches to the right (in FIG. 1). This information or instruction is supplied from the program and is fed into the dimension comparator in the form of numerical reference data evidenced by an electric signal. At the comparator the difference (imbalance) between the reference data and the then zero numerical data fed into the comparator by the fringe counter produces an output signal which activates the "Start, Stop and Direction" servo to cause the prime mover to move the table towards the location 3.7900 inches away at which the work is correctly positioned for the first machining operation.

As the table moves, the trihedral 11 thereon moves with respect to the interferometer that is mounted on the carriage of the machine, whereupon a progression of interference fringes takes place past the photosensitive detector of the interferometer. This produces an oscillating current which is translated by the electronic counter into numerical data that is fed into the comparator. As long as an imbalance exists, the prime mover continues to impart motion to the table.

The velocity of the table motion is controlled by the signal which results from the comparison in the speed comparator of the output from the frequency meter which identifies the instantaneous frequency of the interference fringes, with velocity reference data fed into the speed comparator by the program acting through the speed control servo.

When the table is within a predetermined short distance from its desired position or target, the program calls the automatic deceleration override into action and, by it, the controller is directed to decelerate the movement of the table at a rate within the response time of the servo by which the motion is stopped. Accordingly, the table comes to rest without hunting.

The first machining operation can now take place, which—for purposes of illustration—might be the drilling, reaming or tapping of a hole by an appropriate tool in the tool carrying head. This of course entails descent of the head at the command of the program and under control of the head interferometer.

Upon completion of the first machining operation, the motions of the head, table and carriage needed to bring about subsequent operations, will be commanded by the program and controlled by the interferometers.

It will be observed that throughout execution of all of the various positioning motions, the interferometer measuring system is in charge and constitutes the actual controller for both location and speed. Hence, the drive mechanism by which the motion is produced can be of the infinitely variable type which is incapable of producing motion in finite uniform increments, or—stated in another way—incapable of dimension or speed rate predictability. Also, because of the extremely close measuring resolution obtained with the interferometer, the accuracy of the positioning of the moved part by an infinitely variable drive can be as close to the target as desired—within ten thousandths or one-hundred thousandths of an inch, or even better—the selection of the accuracy level being simply a matter of rendering the comparator insensitive to fringe counts identifying distances less than the selected magnitude of distance from the target.

From the foregoing description taken with the accompanying drawings, it will be apparent to those skilled in the art that this invention makes possible far greater accuracy in the positioning of machine tool parts than was heretofore possible with numerical control systems, and that this accuracy is achieved without sacrificing fast traverse, and at a reduction in cost resulting from elimination of the expensive precision ground lead screws and their complex drive mechanism.

I claim:

1. A system for controlling the distance between first and second devices which are relatively movable along a defined path, comprising:
   A. reversible motor means operatively connected with at least one of said devices to produce relative motion between the two devices;
   B. means for directing monochromatic light toward said second device;
   C. means mounted on said second device for reflecting the light thus received at the second device toward said first device;
   D. means using the reflected light to generate an optical interference pattern consisting of a progression of interference fringes indicative of relative motion between said first and second devices;
   E. counter means to count the progressing interference fringes and in consequence of such count provide a digital representation proportional to the integral of said relative motion and indicative of the total change in relative distance between the two devices;
   F. means for receiving a digital command signal indicative of the desired change in relative distance between the two devices;
   G. comparator means for comparing said digital representation with said digital command signal to provide a position control signal; and
   H. means responsive to said position control signal for automatically effecting and governing the operation of said motor means.

2. A system according to claim 1 wherein said position control signal governs the operation of said motor means by starting and stopping the same and controlling the direction of its operation.

3. A system according to claim 2 further comprising:
   A. means for generating a second digital representation proportional to the rate of progression of said interference fringes and indicative of the rate of change in relative distance between the two devices;
   B. means for receiving a second digital command signal indicative of the desired rate of change in relative distance between the two devices;
   C. second comparator means for comparing said second digital representation with said second digital command signal to provide a velocity control signal; and
   D. means responsive to said velocity control signal for automatically controlling the speed of said motor means.

4. A system according to claim 3 further comprising:
means for comparing said second digital representation with a digital deceleration reference signal to generate an overriding deceleration signal for governing the operation of the motor means and for decelerating the speed of the motor means at a rate not in excess of the response time of the motor means, whereby relative motion is stopped without hunting.

5. A system according to claim 17 wherein said reversible motor means comprises an infinitely variable fluid pressure responsive motor, and wherein said means for automatically effecting and controlling said motor means includes a servo valve through which said fluid pressure responsive motor is connected with a source of pressure.